US012609363B2

(12) United States Patent
Kwon et al.

(10) Patent No.: US 12,609,363 B2
(45) Date of Patent: Apr. 21, 2026

(54) PHOSPHORYLATED VINYL ACETATE COPOLYMER, SEPARATOR, AND NON-AQUEOUS ELECTROLYTE BATTERY INCLUDING THE SAME

(71) Applicant: LG ENERGY SOLUTION, LTD., Seoul (KR)

(72) Inventors: Kyung An Kwon, Daejeon (KR); Kyu Seong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 536 days.

(21) Appl. No.: 18/029,959

(22) PCT Filed: Oct. 27, 2021

(86) PCT No.: PCT/KR2021/015237
§ 371 (c)(1),
(2) Date: Apr. 3, 2023

(87) PCT Pub. No.: WO2022/092814
PCT Pub. Date: May 5, 2022

(65) Prior Publication Data

US 2023/0378548 A1 Nov. 23, 2023

(30) Foreign Application Priority Data

Oct. 29, 2020 (KR) ........................ 10-2020-0142299

(51) Int. Cl.
*H01M 10/42* (2006.01)
*H01M 50/383* (2021.01)
*H01M 50/414* (2021.01)
*H01M 50/449* (2021.01)

(52) U.S. Cl.
CPC ..... *H01M 10/4235* (2013.01); *H01M 50/383* (2021.01); *H01M 50/414* (2021.01); *H01M 50/449* (2021.01)

(58) Field of Classification Search
CPC ............. H01M 50/414; H01M 50/449; H01M 50/383; H01M 10/0525
USPC ......................................... 429/144, 251, 254
See application file for complete search history.

(56) References Cited

U.S. PATENT DOCUMENTS 3,925,455 A 12/1975 Meier
4,847,339 A * 7/1989 Heimberg ............ C08F 210/02 526/292.9
2009/0258300 A1* 10/2009 Moriyama ............. D21H 13/16 428/401
2010/0113264 A1 5/2010 Tsurumi et al.
2013/0230773 A1 9/2013 Tsujikawa et al.
2014/0088249 A1 3/2014 Daniels
2018/0294458 A1 10/2018 Ko et al.
2018/0342767 A1 11/2018 Ahn et al.
2019/0085102 A1 3/2019 Han et al.
2021/0013460 A1 1/2021 Ootsuki et al.

FOREIGN PATENT DOCUMENTS

| | | | |
|---|---|---|---|
| CN | 102250384 A | | 11/2011 |
| CN | 104718227 A | | 6/2015 |
| CN | 108110073 A | | 6/2018 |
| CN | 108352569 A | | 7/2018 |
| EP | 3 521 364 A1 | | 8/2019 |
| JP | 2015034364 A | * | 2/2015 |
| KR | 10-2014-0027045 A | | 8/2014 |
| KR | 10-2015-0040971 A | | 4/2015 |
| KR | 10-2016-0128725 A | | 11/2016 |
| KR | 10-2016-0129567 A | | 11/2016 |
| KR | 10-2018-0003925 A | | 1/2018 |
| KR | 10-2018-0075912 A | | 7/2018 |
| KR | 10-2020-0091227 A | | 3/2026 |
| WO | WO 2016/175515 A1 | | 11/2016 |
| WO | WO 2018/062475 A1 | | 4/2018 |
| WO | WO 2019/163839 A1 | | 8/2019 |

OTHER PUBLICATIONS

Xie et al., Organic-inorganic hybrid strategy based on ternary copolymerization to prepare flame retardant poly(methyl methacrylate) with high performance, Oct. 10, 2020, Composites Part B, 203, 108437 (Year: 2020).*
Farrokhi et al., An efficient method for straightforward phosphorylation of ethylene/vinyl alcohol copolymers using trialkyl phosphite/iodine, Mar. 1, 2019, Polymer, 169, 215-224 (Year: 2019).*
International Search Report (PCT/ISA/210) issued in PCT/KR2021/015237 mailed on Feb. 8, 2022.
Tretsiakova-Mcnally et al., "Pyrolysis Combustion Flow Calorimetry Studies on Some Reactively Modified Polymers", Polymers 2015, vol. 7, No. 3, pp. 453-467.
Li et al., "Research Progress in the Flame Retardancy of EVA," China Plastics, vol. 30, No. 4, Apr. 2016, pp. 6-11.
Extended European Search Report for European Application No. 21886808.1, dated Feb. 23, 2024.

* cited by examiner

*Primary Examiner* — Sean P Cullen
(74) *Attorney, Agent, or Firm* — Birch, Stewart, Kolasch & Birch, LLP

(57) ABSTRACT

A flame retardant group-containing polymer, a separator of a non-aqueous electrolyte battery comprising the flame retardant group-containing polymer, and a non-aqueous electrolyte battery. The flame retardant group-containing polymer includes a first repeating unit, a second repeating unit, and a third repeating unit.

13 Claims, No Drawings

PHOSPHORYLATED VINYL ACETATE COPOLYMER, SEPARATOR, AND NON-AQUEOUS ELECTROLYTE BATTERY INCLUDING THE SAME

CROSS-REFERENCE TO RELATED APPLICATION(S)

This application claims the benefit of Korean Patent Application No. 10-2020-0142299 filed on Oct. 29, 2020 in the Korean Intellectual Property Office, the disclosures of which are incorporated herein by reference in their entirety.

TECHNICAL FIELD

The present disclosure relates to a flame retardant group-containing polymer, a separator of a non-aqueous electrolyte battery comprising the same, and a non-aqueous electrolyte battery.

BACKGROUND ART

Recently, as a power source for a mobile terminal such as that of a notebook computer or a cellular phone or as a power source for a hybrid vehicle or an electric vehicle, a non-aqueous electrolyte battery with high voltage and high energy density, in particular a lithium ion secondary battery, is getting the attention. The non-aqueous electrolyte battery typified by a lithium ion secondary battery has high capacity and high energy density so that a large electric current flows at the time of internal short circuit or external short circuit of the battery. Thus, there is a problem that heat is generated in the battery due to Joule heat caused by short circuit, the battery is swelled due to gas generation accompanied with decomposition of an electrolyte solution, and properties of the battery are deteriorated.

According to a current lithium ion secondary battery, in order to resolve such a problem, a separator comprising a porous substrate having fine pores such as a polypropylene or polyethylene film is interposed between a positive electrode and a negative electrode. When the temperature increases owing to the heat generated by short circuit, the separator comprising the porous substrate melts to block the pores. As a result, movement of ions is inhibited so that the current does not flow and runaway of the battery is suppressed.

Because of wider use of a lithium ion secondary battery, a battery having higher heat resistance, in particular improved heat resistance at the time of internal short circuit has been currently required. Particularly, when the internal short circuit occurs, it is believed that the temperature increases to 600° C. or more at the short circuit region owing to local heat generation. Thus, in a conventional separator comprising a porous substrate having fine pores such as a polyolefin film, the separator is shrunken or melted by heat generated by the short circuit at the short circuit region so that the battery is exposed to dangers of fuming, ignition and explosion.

As a technology for preventing the short circuit caused by heat shrinkage or heat melting of a separator and improving reliability of a battery, a multilayer separator comprising a heat-resistant porous layer on one or both surfaces (i.e., frond and back surfaces) of a porous substrate having fine pores such as a polyethylene film is suggested.

In such a separator, the heat-resistant porous layer uses an inorganic material and a polymer containing a cyanoethyl group or a flame retardant group as a dispersing agent for evenly dispersing the inorganic material. However, sufficient stability of the separator of the battery may be secured when the dispersant maintains dispersibility at an appropriate level. When the dispersibility is poor, it is difficult to secure sufficient thermal stability of the separator because the inorganic substance is not evenly dispersed.

Therefore, there is a need for research on a separator having excellent adhesive strength and dispersibility, and excellent in safety in the event of an accident such as fuming, ignition, or explosion.

DETAILED DESCRIPTION OF THE INVENTION

Technical Problem

It is one object of the present disclosure to provide a separator of a non-aqueous electrolyte battery, the separator capable of strongly adhering an inorganic filler upon forming a heat-resistant porous layer of the separator, as well as being excellent in flame retardancy and thus excellent in safety in the event of an accident such as fuming, ignition or explosion, while further improving the heat resistance of the separator by effectively dispersing the inorganic filler, and a non-aqueous electrolyte battery,

Technical Solution

Provided herein is a flame retardant group-containing polymer comprising: a first repeating unit represented by the following Chemical Formula 1, a second repeating unit represented by the following Chemical Formula 2, and a third repeating unit represented by the following Chemical Formula 3:

[Chemical Formula 1]

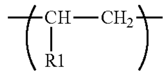

in Chemical Formula 1, R1 is hydrogen or an alkyl having 1 to 8 carbon atoms,

[Chemical Formula 2]

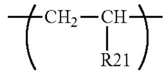

in Chemical Formula 2, R21 is an acetate ($CH_3COO$—) group,

[Chemical Formula 3]

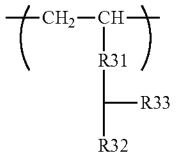

in Chemical Formula 3, R31 is —(C═O)O—, R32 is a phosphorus-containing flame retardant group, and R33 is an electron withdrawing group.

According to one embodiment of the present disclosure, in Chemical Formula 3 R32 may include at least one flame retardant group selected from the group consisting of the following Chemical Formulas:

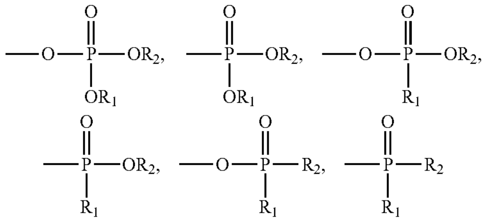

wherein, $R_1$ and $R_2$ are each independently hydrogen, a monovalent metal cation, an ammonium ion, an alkyl group having 1 to 5 carbon atoms, a phenyl group, or an alkylaryl group having 7 to 10 carbon atoms.

And, the R33 may be —CN, —$NO_2$, —CO—R34, —CON—R34, or —COO—R34, wherein R34 is hydrogen, or an alkyl having 1 to 5 carbon atoms.

At this time, it may be more preferable that the $R_1$ and $R_2$ are each independently hydrogen, an ammonium ion, an alkyl group having 1 to 5 carbon atoms, or a phenyl group.

In the flame-retardant group-containing polymer, a ratio of the repeating number of the first repeating unit to the total repeating number of the first to third repeating units, i.e., a ratio of the repeating units derived from an alkene-based monomer may be about 0.1 to about 0.5, the lower limit value thereof may be about 0.1 or more, or about 0.15 or more, and the upper limit value thereof may be about 0.5 or less, or about 0.45 or less.

In the flame-retardant group-containing polymer, a ratio of the repeating number of the second repeating unit to the total repeating number of the first to third repeating units, i.e., a ratio of the repeating units derived from a vinyl acetate-based monomer may be about 0.3 to about 0.8, the lower limit value thereof may be about 0.3 or more, or about 0.4 or more, or about 0.45 or more, and the upper limit value thereof may be about 0.8 or less, or about 0.75 or less.

In the flame-retardant group-containing polymer, a ratio of the repeating number of the third repeating unit to the total repeating number of the first to third repeating units, i.e., a ratio of the repeating units into which flame retardant groups are introduced may be about 0.01 to about 0.3, the lower limit value thereof may be about 0.01 or more, or more than about 0.02, or about 0.03 or more, or about 0.04 or more, and the upper limit value thereof may be about 0.3 or less, or less than about 0.3, or about 0.25 or less.

According to another embodiment of the present disclosure, the weight average molecular weight value of the flame retardant group-containing polymer may be 100,000 to 500,000 g/mol, the lower limit thereof may be about 100,000 g/mol or more, or about 150,000 g/mol or more, and the upper limit thereof may be about 500,000 g/mol or less, or about 400,000 g/mol or less, or about 350,000 g/mol or less.

According to another embodiment of the present disclosure, there is provided a dispersant composition for a separator of a non-aqueous electrolyte battery, comprising the flame retardant group-containing polymer.

The dispersant composition for a separator of a non-aqueous electrolyte battery may further include an inorganic filler.

At this time, the inorganic filler may comprise one or more selected from the group consisting of inorganic oxides, inorganic nitrides, poorly soluble ionic crystal fine particles, covalently bonded crystals, clay, materials derived from mineral resources, lithium titanium phosphate, and a combination thereof.

Meanwhile, according to another embodiment of the present disclosure, there is provided a separator of a non-aqueous electrolyte battery, the separator comprising: a porous substrate, and a heat resistant porous layer on one surface of the porous substrate, wherein the heat resistant porous layer comprises the dispersant composition for a separator of a non-aqueous electrolyte battery according to claim 8.

At this time, the porous substrate may comprise one or more resins selected from the group consisting of a polyolefin resin, a polyester resin, a polyacetal resin, a polyamide resin, a polycarbonate resin, a polyimide resin, a polyetheretherketone resin, a polyethersulfone resin, and a combination thereof.

Meanwhile, according to yet another embodiment of the present disclosure, there is provided a non-aqueous electrolyte battery comprising: a positive electrode, a negative electrode, the separator of a non-aqueous electrolyte battery, and an electrolyte solution.

The terms "first," "second," etc. are used to explain various elements, and these terms are only used to distinguish one constitutional element from the other constitutional elements.

The technical terms used herein is for the purpose of describing exemplary embodiments only and is not intended to limit the scope of the invention. The singular forms "a," "an" and "the" are intended to include plural forms, unless the context clearly indicates otherwise. It should be understood that the terms "comprise," "include", "have", etc. are used herein to specify the presence of stated features, integers, steps, components or combinations thereof, but do not preclude the presence or addition of one or more other features, integers, steps, components, or combinations thereof.

Also, as used herein, in case a layer or an element is mentioned to be formed "on" layers or elements, it means that the layer or element is directly formed on the layers or elements, or it means that other layers or elements may be additionally formed between the layers, on a subject, or on a substrate.

Although the present disclosure may have various forms and various modifications can be made thereto, specific examples will be exemplified and explained in detail. However, it is not intended to limit the present disclosure to disclosed forms, and it should be understood that all the modifications, equivalents or substitutions within the idea and technical scope of the present disclosure are included in the present disclosure.

Now, a polymer, a composition, a separator of a non-aqueous electrolyte battery comprising the same, and a non-aqueous electrolyte battery according to specific embodiments of the present disclosure will be described in more detail.

Polymer

According to an embodiment of the present disclosure, there is provided a flame retardant group-containing polymer comprising: a first repeating unit represented by the following Chemical Formula 1, a second repeating unit represented by the following Chemical Formula 2, and a third repeating unit represented by the following Chemical Formula 3:

[Chemical Formula 1]

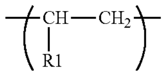

in Chemical Formula 1, R1 is hydrogen or an alkyl having 1 to 8 carbon atoms,

[Chemical Formula 2]

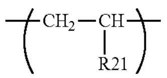

in Chemical Formula 2, R21 is an acetate ($CH_3COO$—) group,

[Chemical Formula 3]

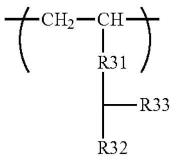

in Chemical Formula 3, R31 is —(C═O)O—, R32 is a phosphorus-containing flame retardant group, and R33 is an electron withdrawing group.

The phosphorus-containing flame retardant group refers to a phosphorus atom-containing functional group contained in a compound used as a phosphorus-containing flame retardant to impart flame retardancy, and more specifically, it refers to a phosphate group, a phosphonate group, a phosphinate group, a phosphine oxide group, or a phosphazene group.

The present inventors have confirmed through experiments that, in a flame retardant group-containing polymer used as a dispersant of an inorganic filler in a heat-resistant porous layer of a separator of a non-aqueous electrolyte battery, when a flame retardant group is introduced into the polymer side chain and further a ratio of respective repeating units constituting the polymer, i.e., a degree of introduction of ethylene-based, vinyl acetate-based, and flame-retardant groups, is controlled, the adhesion of the inorganic filler can be enhanced and the dispersibility of the inorganic filler may also be increased, and as a result, heat resistance of the separator may be improved and at the same time, flame retardancy can be imparted to the separator, thereby completing the present disclosure.

It is well known that in a separator of a non-aqueous electrolyte battery, a cyanoethyl group-containing polymer or a flame retardant group-containing polymer acts as a binder for firmly adhering the inorganic filler. However, a method of imparting properties such as flame retardancy by introducing a functional group into the side chain of such a polymer is not known in detail.

The flame retardant group-containing polymer according to an aspect of the present disclosure acts as a binder to firmly adhere the inorganic filler upon forming a heat-resistant porous layer of a separator, and also plays a role as a dispersant capable of effectively dispersing the inorganic filler, and further flame retardancy is also provided. Therefore, it is possible to realize a separator having remarkably improved adhesion, heat resistance, and flame retardancy, as compared to the prior art.

According to one aspect of the present disclosure, provided is a flame retardant group-containing polymer comprising: a first repeating unit represented by the following Chemical Formula 1, a second repeating unit represented by the following Chemical Formula 2, and a third repeating unit represented by the following Chemical Formula 3:

[Chemical Formula 1]

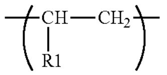

in Chemical Formula 1, R1 is hydrogen or an alkyl having 1 to 8 carbon atoms,

[Chemical Formula 2]

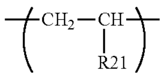

in Chemical Formula 2, R21 is an acetate ($CH_3COO$—) group,

[Chemical Formula 3]

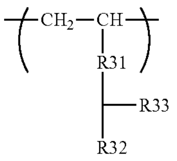

in Chemical Formula 3, R31 is —(C═O)O—, R32 is a phosphorus-containing flame retardant group, and R33 is an electron withdrawing group.

In such a flame retardant group-containing polymer, the repeating unit represented by Chemical Formula 1 can be deemed to be a repeating unit derived from alpha olefins such as ethylene, propylene, butene, that is, an alkene-based monomer, and these monomers may be specifically represented by the following Chemical Formula 1-1.

$R1\text{-}CH{=}CH_2$ [Chemical Formula 1-1]

in Chemical Formula 1-1, R1 is as defined in Chemical Formula 1 above.

Further, the repeating unit represented by Chemical Formula 2 can be deemed to be ii) a repeating unit derived from a vinyl acetate-based monomer, and such a monomer may be specifically represented by the following Chemical Formula 2-1.

$CH{=}CH\text{—}R21$ [Chemical Formula 2-1]

in Chemical Formula 2-1, R21 is as defined in Chemical Formula 2 above.

A copolymer in which vinyl acetate or vinyl alcohol-based repeating unit is introduced into an ethylene repeating unit, or a copolymer in which a cyanoethyl group is further introduced therein is commonly used for bonding and dispersing a substrate component and an inorganic filler in a separator of a non-aqueous electrolyte battery. In particular, the carbonyl group of vinyl acetate can improve the dispersibility of the inorganic filler by interacting with the inorganic filler.

Further, the repeating unit represented by Chemical Formula 3 can be deemed to be iii) a repeating unit derived from a vinyl-acetate-based monomer into which a flame retardant group is introduced, and such a monomer may be specifically represented by the following Chemical Formula 3-1 or 3-2.

[Chemical Formula 3-]

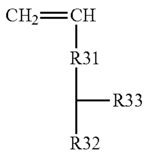

[Chemical Formula 3-2]

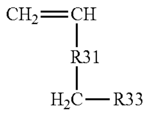

in Chemical Formulas 3-1 and 3-2, R31, R32, and R33 are as defined in Chemical Formula 3 above. Further, the flame retardant group represented by R32 may be in the form of being introduced from the beginning into the monomer used for the polymerization, as shown in Chemical Formula 3-1, and it may also be introduced into the carbon adjacent to the CN via an addition reaction or the like after polymerization proceeds using the monomer of Chemical Formula 3-2.

The flame retardant group may be one or more selected from the group consisting of a phosphate group, a phosphonate group, a phosphinate group, a phosphine oxide group, and a phosphazene group.

According to one embodiment of the present disclosure, in Chemical Formula 3 R32 may include one or more flame retardant groups selected from the group consisting of the following Chemical Formulas.

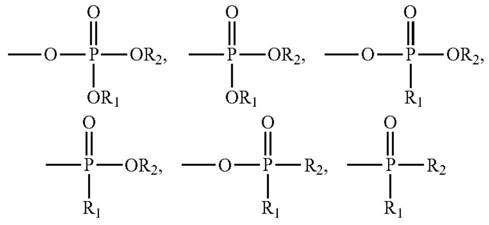

wherein, $R_1$ and $R_2$ are each independently hydrogen, a monovalent metal cation, an ammonium ion, an alkyl group having 1 to 5 carbon atoms, a phenyl group, or an alkylaryl group having 7 to 10 carbon atoms.

At this time, it may be more preferable that the $R_1$ and $R_2$ are each independently hydrogen, an ammonium ion, an alkyl group having 1 to 5 carbon atoms, or a phenyl group.

Further, one or more flame retardant groups selected from the group consisting of the above-described chemical formulas may be linked to the repeating unit of Chemical Formula 3 by an alkylene having 1 to 5 carbon atoms or an alkynylene group having 1 to 5 carbon atoms, wherein one or more flame retardant groups may be introduced into one repeating unit.

Such a phosphorus-containing flame retardant group may reduce the possibility of a fire due to an electrical defect during charge and discharge of the secondary battery.

Specifically, such a phosphorus-containing flame retardant group can promote the formation of char by a mechanism such as a transesterification reaction, a dehydration reaction, a dehydrogenation reaction, and a carbonization reaction in the event of a fire. This char can physically block heat transfer and access to oxygen due to a fire, thereby preventing a fire.

Further, the phosphorus-containing flame retardant group forms a phosphoric acid radical by thermal decomposition, and such phosphoric acid radical can capture substances such as hydrogen or hydroxy radicals and effectively blocks the propagation of an oxidation reaction or a combustion reaction, thereby preventing a fire from becoming larger.

From this point of view, in the flame retardant group-containing polymer, the ratio of the repeating number of the first repeating unit to the total repeating number of repeating units of the first to third repeating units, that is, the ratio of the repeating units derived from an alkene-based monomer may be about 0.1 to about 0.5, the lower limit value thereof may be about 0.1 or more, or about 0.15 or more, and the upper limit value thereof may be about 0.5 or less, or about 0.45 or less.

When the ratio of the repeating number of the first repeating unit, that is, the ratio of repeating units derived from an alkene-based monomer is too low, the adhesion between the separator and the inorganic porous material is weak, which may cause problems such as heat shrinkage of the separator.

Further, in the flame retardant group-containing polymer, the ratio of the repeating number of the second repeating unit to the total repeating number of repeating units of the first to third repeating units, that is, the ratio of the repeating units derived from an vinyl acetate-based monomer may be about 0.3 to about 0.8, the lower limit value thereof may be about 0.3 or more, or about 0.4 or more, or about 0.45 or more, and the upper limit value thereof may be about 0.8 or less, or about 0.75 or less.

When the ratio of the repeating number of the second repeating unit, that is, the ratio of repeating units derived from a vinyl acetate-based monomer is too low, dispersion of the inorganic porous material adhered to the separator is not performed well, which may cause the problem of thermal expansion at the local point of the separator.

Further, in the flame retardant group-containing polymer, the ratio of the repeating number of the third repeating unit to the total repeating number of repeating units of the first to third repeating units, that is, the ratio of the repeating units into which the flame retardant group is introduced may be about 0.01 to about 0.3, and the lower limit value thereof may be about 0.01 or more, or more than about 0.02, or about 0.03 or more, or about 0.04 or more, and the upper limit value thereof may be 0.3 or less, or less than about 0.3, or about 0.25 or less.

When the ratio of the repeating number of the third repeating unit, that is, the ratio of repeating units into which the flame retardant group is introduced is too low, there may be a problem that the rate of fire increases when a phenomenon such as heat shrinkage of the separator occurs.

Such a flame retardant group-containing polymer can be prepared by copolymerization of i) alpha olefins such as ethylene, propylene, butene, that is, alkene-based monomers, ii) a vinyl acetate-based monomer, and iii) vinyl acetate-based monomers into which flame retardant groups are introduced.

iii) In the case of a vinyl acetate-based monomer into which a flame retardant group is introduced, polymerization may be performed using a monomer having a flame retardant group introduced into the side branch from the beginning, or polymerization may be performed using a vinyl acetate-based monomer into which a flame retardant group is not introduced, and then a flame retardant group may also be introduced therein through a separate addition reaction or the like.

However, from the viewpoint of the stability of the polymerization reaction, after performing polymerization using a vinyl acetate-based monomer into which a flame retardant group is not introduced, it may be preferable to introduce a flame retardant group to a moiety adjacent to the electron withdrawing group through a separate addition.

At the time of polymerization, a solution polymerization method can be used in which each monomer is added to a solvent to prepare a monomer mixture for polymerization, and the polymerization reaction is performed in the presence of an initiator.

At this time, as the solvent, solvents that do not affect the polymerization reaction of the monomers, for example, water, an alcohol-based solvent such as methanol, ethanol, isopropanol, butanol, isobutanol, a ketone solvent such as dimethyl ketone, diethyl ketone, methyl ethyl ketone, and methyl isobutyl ketone, an aromatic solvent such as toluene and xylene, and the like, can be used without particular limitation.

The solvent is preferably used in an amount of about 20 to about 300 parts by weight based on 100 parts by weight of the total monomer for smooth progress of the polymerization reaction.

Further, the polymerization initiator used during polymerization is a radical photopolymerization or thermal polymerization initiator commonly used for the polymerization reaction of the above-mentioned monomers, and the type thereof is not particularly limited. However, it may be preferable to use a thermal polymerization initiator in order to smoothly proceed the polymerization reaction.

Specifically, the thermal polymerization initiator may include, for example, azo-based or peroxide-based initiators, such as 2,2'-azobisisobutyronitrile (AIBN), 2,2'-azobis-(2,4-dimethylvaleronitrile), 2,2'-azobis-(4-methoxy-2,4-dimethylvaleronitrile), benzoyl peroxide, lauroyl peroxide, t-butylperoxypivalate and 1,1'-bis-(bis-t-butylperoxy)cyclohexane.

The initiator may be used in an amount of about 0.05 to 5 parts by weight, or about 0.1 to about 3 parts by weight, based on 100 parts by weight of the total monomer.

These initiators can be prepared in a state of being contained in the above-described monomer mixture from the beginning, or it may be added separately after raising the temperature of the previously prepared monomer mixture to an appropriate polymerization temperature.

The temperature of the polymerization reaction may proceed from room temperature to about 100° C., and it may preferably proceed at a temperature of about 40° C. or more, or about 50° C. or more, and about 90° C. or less, or about 80° C. or less.

When polymerization proceeds using a vinyl acetate-based monomer into which a flame retardant group is not introduced, a flame retardant group is introduced into a moiety adjacent to the electron withdrawing group through a separate addition reaction or the like after the polymerization.

The addition reaction may proceed continuously following the polymerization reaction described above, or may be performed separately.

The addition reaction can be represented by the following reaction mechanism.

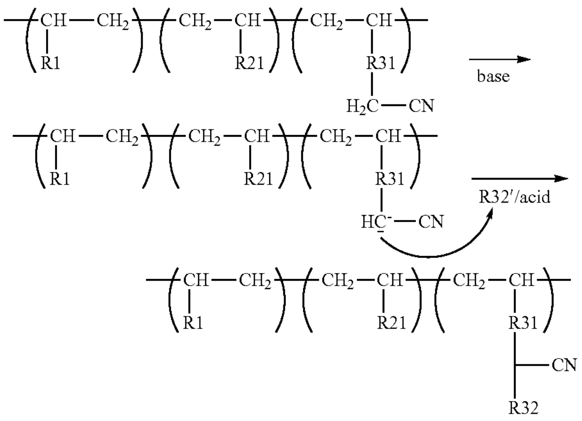

In step 1, a base is charged into the polymer. The base removes hydrogen of a moiety adjacent to the CN group to form a carbon anion at the corresponding carbon. This carbon anion can maintain stably due to the inductive effect and resonance effect of the adjacent electron withdrawing group.

The flame retardant compound of R32' is added thereto. R32' is a precursor of the R32 flame-retardant group of Chemical Formula 3 above, and uses a compound containing a carbon-carbon unsaturated bond in the molecule in addition to the flame-retardant group.

The unshared electron pair of the above-mentioned carbon anion is linked to the carbon-carbon unsaturated bond of R32' via an addition reaction, and a new carbocation is formed at the adjacent carbon, to which hydrogen is supplied from the acid, and the reaction can be completed.

According to another embodiment of the present disclosure, the weight average molecular weight value of the flame retardant group-containing polymer may be 150,000 to 500,000 g/mol, the lower limit thereof may be about 200,000 g/mol or more, or about 240,000 g/mol or more, and the upper limit thereof may be about 500,000 g/mol or less, or about 450,000 g/mol or less, or about 350,000 g/mol or less.

Due to the complex factors such as the ratio of each repeating unit, the molecular weight of the polymer, and the like, the adhesion of the inorganic filler can be improved, and the inorganic filler can be effectively dispersed.

In this regard, the weight average molecular weight value may be measured by gel permeation chromatography (GPC) using polystyrene standards.

Composition and Separator of Non-Aqueous Electrolyte Battery

Meanwhile, according to another aspect of the present disclosure, there is provided a dispersant composition for a separator of a non-aqueous electrolyte battery, including a flame retardant group-containing polymer.

The dispersant composition for a separator of a non-aqueous electrolyte battery may further include an inorganic filler.

The inorganic filler is not particularly limited as long as it has a melting point of about 200° C. or more, has high electrical insulation, is electrochemically stable, and is stable in an electrolyte solution or a solvent used for a slurry for forming a heat-resistant porous layer.

The inorganic filler may include one or more selected from the group consisting of inorganic oxides, inorganic nitrides, poorly soluble ionic crystal fine particles, covalently bonded crystals, clay, materials derived from mineral resources, lithium titanium phosphate, and combinations thereof.

More specifically, the inorganic filler may include, for example, fine particles of inorganic oxides such as iron oxide, $SiO_2$ (silica), $Al_2O_3$ (alumina), $TiO_2$, $BaTiO_3$, ZrO, $PB(Mg_3Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, etc.; fine particles of inorganic nitrides such as aluminum nitride, silicon nitride, etc.; fine particles of poorly soluble ionic crystals such as calcium fluoride, barium fluoride, barium sulfate, etc.; fine particles of covalent crystals such as silicone, diamond, etc.; fine particles of clay such as talc, montmorillonite, etc.; a material derived from a mineral such as boehmite, zeolite, apatite, kaolin, mullite, spinel, olivine, sericite, bentonite, etc., or lithium titanium phosphate ($Li_xTi_y(PO_4)_3$, wherein x and y are numbers satisfying $0<x<2$ and $0<y<3$, respectively); and any combination thereof.

The particle diameter of the inorganic filler is not particularly limited, but in order to form a heat-resistant porous layer of uniform thickness and at the same time obtain an appropriate porosity, those having an average particle diameter of about 5 nm to about 5 μm may be used, preferably, from about 0.01 to about 1 μm may be used.

Meanwhile, the mean particle diameter herein may be measured by a device based on a laser diffraction scattering method.

When the particle diameter of the inorganic filler is too small, there is a problem in that dispersibility is lowered and thus it may be difficult to adjust the physical properties of the separator.

When the particle diameter of the inorganic filler is too large, there is a problem that strength of the heat-resistant porous layer is lowered and smoothness of the surface tends to get deteriorated. In addition, the heat-resistant porous layer becomes thicker, and thus it is apprehended that the mechanical properties are lowered.

Further, the composition used to form a heat-resistant porous layer in a separator of a non-aqueous electrolyte battery may include the above-described flame retardant group-containing polymer, and if necessary, a resin such as cyanoethyl-containing polymer, ethylene-vinyl acetate copolymer (EVA, containing 20 to 35 mol % of repeating unit derived from vinyl acetate), acrylate copolymer, styrene butadiene rubber (SBR), polyvinyl butyral (PVB), polyvinyl pyrrolidone (PVP), polyurethane, polyvinylidene fluoride-hexafluoropropylene, polyvinylidene fluoride-trichlorethylene, polyvinylidene fluoride-chlorotrifluoroethylene copolymer, polyvinylidene fluoride-hexafluoropropylene, polyvinylidene fluoride-trichloroethylene, cellulose acetate, cellulose acetate butyrate, cellulose acetate propionate, and the like.

When these resins are further used, the resin may be mixed in an amount of about 10 to about 1,000 parts by weight with respect to 100 pars by weight of the flame retardant group-containing polymer.

Meanwhile, according to yet another aspect of the present disclosure, there is provided a separator of a non-aqueous electrolyte battery, the separator comprising: a porous substrate, and a heat resistant porous layer on one surface of the porous substrate, wherein the heat resistant porous layer comprises the above-mentioned dispersant composition for a separator of a non-aqueous electrolyte battery.

The heat-resistant porous layer may further include an inorganic filler.

Specifically, the separator of a non-aqueous electrolyte battery of the present disclosure may be a separator including a heat-resistant porous layer including the dispersant composition and an inorganic filler, and a porous substrate, wherein the heat-resistant porous layer may be formed on one surface or both surfaces of the porous substrate, and the inside of the heat-resistant porous layer may have many pores resulting from the voids present among inorganic fillers.

When the heat-resistant porous layer is formed on one surface of the porous substrate, the heat resistant-porous layer may be formed on either a positive electrode side or a negative electrode side surface.

Meanwhile, a method of forming the heat-resistant porous layer is not particularly limited. For example, the heat-resistant porous layer may be formed by dispersing the inorganic filler in the dispersant composition to prepare a slurry, coating the slurry onto the porous substrate, and then drying and removing the solvent.

Here, the solvent used in the dispersant composition is not particularly limited as long as the above-mentioned flame retardant group-containing polymer is dissolved therein. Examples of the solvent may include acetone, tetrahydrofuran, cyclohexanone, ethylene glycol monomethyl ether, methyl ethyl ketone, acetonitrile, furfuryl alcohol, tetrahydrofurfuryl alcohol, methyl acetoacetate, nitromethane, N,N-dimethylformamide (DMF), N-methyl-2-pyrrolidone, γ-butyrolactone, propylene carbonate, and the like.

The solvent may be used in an amount of about 300 parts by weight to about 5,000 parts by weight with respect to 100 parts by weight of the flame retardant group-containing polymer and the resin.

As for the method of dispersing the inorganic filler in the above-mentioned dispersant composition, a known method of using a stirrer, a disperser, a pulverizer, or the like may be employed. In particular, a ball mill method may be used.

A relative content ratio between the dispersant composition and the inorganic filler in the slurry is not particularly limited, but it may be adjusted according to the thickness, the average pore diameter, and porosity of the heat-resistant porous layer to be prepared.

Specifically, the content of the inorganic filler in the heat-resistant porous layer may be about 50% by weight or more, or about 95% by weight or less.

When the content of the inorganic filler is too low, there is problem that a pore portion in the heat-resistant porous layer becomes small and thus the battery performance may be deteriorated or sufficient heat resistance may not be obtained. When the content of the inorganic filler is too high, there is problem that the heat resistant-porous layer may become brittle and thus it may be difficult to handle.

Meanwhile, the heat-resistant porous layer may have low resistance because the pores ensure a route for ionic conduction. The average pore diameter is not particularly limited as long as it is large enough for the lithium ions contained in an electrolyte solution described below to pass through. The average pore diameter may be about 5 nm to about 5 μm, and preferably, about 0.1 to about 3 μm from the viewpoint of mechanical strength of the heat-resistant porous layer. The porosity may be in the range of about 5 to about 95%, and preferably, about 20 to about 70%.

Here, the average pore diameter may be measured by using a mercury intrusion porosimeter. The porosity may be calculated based on the following Equation, after obtaining true density (d) of an inorganic filler, volume (v) of a heat-resistant porous layer, and weight (m) of a heat-resistant porous layer.

$$\text{Porosity (\%)}=\{1-m/(vd)\}\times 100$$

The heat-resistant porous layer having an average pore diameter and a porosity in the above range may be obtained by controlling the particle diameter or the content of the inorganic filler, as described above.

Meanwhile, the porous substrate may include a thermoplastic resin component.

The thermoplastic resin component may melt to close the pores in the porous substrate if the temperature becomes higher than a certain limit, whereby ion movement is blocked, an electric current may stop, and heat generation or ignition may be suppressed.

The thermoplastic resin used as the porous substrate may include polyolefin resins such as low density polyethylene, high density polyethylene, ultra-high molecular weight polyethylene, polypropylene, etc.; polyester resins such as polyethylene terephthalate, polybutylene terephthalate, etc.; polyacetal resins; polyamide resins; polycarbonate resins; polyimide resins; polyether ether ketone resins; polyether sulfone resins; and any combination thereof.

Meanwhile, the porous substrate may be preferably a film. Although the thickness thereof is not particularly limited, it is preferably about 2 μm to about 50 μm. When the thickness is too thin, there is a problem that it is difficult to maintain the mechanical properties. When the thickness is too thick, there is a problem that it may function as a resistant layer.

Although the average pore diameter and the porosity of the porous substrate are not particularly limited, the average pore diameter may be preferably about 0.1 to about 30 μm and the porosity may be preferably about 10% to about 90%.

When the pore size is too small or the porosity is too low, there is a problem in that the ion conductivity may deteriorate, and when the average pore diameter is too large or the porosity is too high, there is a problem that mechanical strength may deteriorate, and thus the substrate may not function as a substrate.

The average pore diameter may be measured in the same manner as that for the heat-resistant porous layer. Meanwhile, the porosity may be calculated based on the following Equation, after obtaining true density (d) of a porous substrate, volume (v) of the porous substrate, and weight (m) of a porous substrate.

$$\text{Porosity } (\%)=\{1-m/(vd)\}\times 100$$

Meanwhile, a method of coating the slurry onto the porous substrate may include a coating method commonly used in the art, and is not particularly limited as long as it can achieve a desirable film thickness or a coating area. Examples of the method may include a gravure coater method, a reverse roll coater method, a transfer roll coater method, a kiss coater method, a dipping coater method, a knife coater method, an air doctor coater method, a blade coater method, a rod coater method, a squeeze coater method, a cast coater method, a die coater method, a screen printing method, a spray coating method, and the like.

The total thickness of the separator of a non-aqueous electrolyte battery thus obtained is not particularly limited and may be adjusted in consideration of application and performance of the battery. It may be preferably in the range of about 2 to about 55 rum from the viewpoint of ensuring separation between a positive electrode and a negative electrode.

Non-Aqueous Electrolyte Battery

Meanwhile, the non-aqueous electrolyte battery according to an aspect of the present disclosure may include a positive electrode, a negative electrode, the above-mentioned separator of a non-aqueous electrolyte battery, and an electrolyte solution.

Specifically, the separator of a non-aqueous electrolyte battery is disposed between the positive electrode and the negative electrode, and immersed in an electrolyte solution to produce a non-aqueous electrolyte battery.

When the separator of a non-aqueous electrolyte battery in which the heat-resistant porous layer is formed on one surface of the porous substrate is used, the separator may be disposed in such a manner that the surface of the heat-resistant porous layer faces any side of the positive electrode and negative electrode.

The non-aqueous electrolyte battery of the present disclosure may include, for example, a lithium secondary battery such as a lithium metal secondary battery, a lithium ion secondary battery, a lithium polymer secondary battery, a lithium ion polymer secondary battery, and the like.

Meanwhile, the positive electrode and the negative electrode may be generally manufactured by coating an electrode current collector with an electrode mixture prepared by dispersing a positive electrode or negative electrode active material and a conductive aid in a binder solution.

The positive electrode active material may include a lithium-containing transition metal oxide having a layered structure, represented by Chemical Formula of $Li_{1+x}MO_2$($-0.1<x<0.1$, M: Co, Ni, Mn, Al, Mg, Zr, Ti, Sn, etc.); a lithium manganese oxide having a spinel structure such as $LiMn_2O_4$ or a composition having part thereof substituted with one or more of the other elements; and an olivine type compound represented by $LiMPO_4$(M: Co, Ni, Mn, Fe, etc.).

The lithium-containing transition metal oxide having a layered structure may include, for example, $LiCoO_2$ or $LiNi_{1-x}Co_{x-y}Al_yO_2$($0.1\leq x\leq 0.3$, $0.01\leq y\leq 0.2$), and an oxide containing at least Co, Ni, and Mn ($LiMn_{1/3}Ni_{1/3}Co_{1/3}O_2$, $LiMn_{5/12}Ni_{5/12}Co_{1/6}O_2$, $LiNi_{3/5}Mn_{1/5}Co_{1/5}O_2$, etc.).

Meanwhile, the negative electrode active material may include, for example, a lithium metal, a lithium alloy such as lithium aluminum alloy, etc., a carbonaceous material capable of storing and releasing lithium, graphite, cokes such as a phenol resin, a furan resin, etc., carbon fibers, glass-like carbon, pyrolytic carbon, active carbon, and the like.

Meanwhile, the positive electrode current collector may include, for example, a thin metal foil made of aluminum, nickel, or a combination thereof. The negative electrode current collector may include, for example, a thin metal foil made of copper, gold, nickel, copper alloy, or a combination thereof.

Meanwhile, the conductive aid may include, for example, carbon black such as acetylene black, ketjen black KETJEN BLACK®, etc.; metal fibers such as aluminum, nickel, etc.; natural graphite, heat-expanding graphite, carbon fibers, ruthenium oxide, titanium oxide, etc. Among them, acetylene black or KETJEN BLACK® may be preferably used, as it may provide desired conductivity with addition of a small amount thereof.

Meanwhile, the binder may include various known binders. Examples thereof may include polytetrafluoroethylene, polyvinylidene fluoride, carboxymethyl cellulose, a cross-linked polymer of fluoroolefin copolymers, styrene-butadiene copolymer, polyacrylonitrile, polyvinyl alcohol, and the like.

The binder may include those dissolved in a solvent. Examples of the solvent may include N-methyl-2-pyrrolidone (NMP).

Meanwhile, as for the electrolyte solution, a solution in which a lithium salt is dissolved in an organic solvent may be used. The lithium salt is not particularly limited as long as it dissociates in a solvent to form $Li^+$ ion and does not easily cause a side reaction such as decomposition within the voltage range in which the battery is used.

For example, an inorganic lithium salt such as $LiClO_4$, $LiPF_6$, $LiBF_4$, $LiAsF_6$, $LiSbF_6$, etc., and an organolithium salt such as $LiCF_3SO_3$, $LiCF_3CO_2$, $Li_2C_2F_4(SO_3)_2$, $LiN(CF_3SO_2)_2$, $LiC(CF_3SO_2)_3$, $LiCnF_{2n+1}SO_3(n\geq 2)$, $LiN(RfOSO_2)_2$, etc. (wherein Rf represents a fluoroalkyl group) may be used. Preferred examples of the lithium salt may include $LiPF_6$, $LiClO_4$, $LiAsF_6$, $LiBF_4$, $LiCF_3SO_3$, $Li(CF_3SO_2)_2N$.

Meanwhile, the organic solvent used for the electrolyte solution is not particularly limited as long as it may dissolve the lithium salt and does not cause a side reaction such as decomposition within the voltage range in which the battery is used. For example, cyclic carbonate esters such as propylene carbonate, ethylene carbonate, etc., chain carbonate esters such as ethyl methyl carbonate, diethyl carbonate, dimethyl carbonate, dipropyl carbonate, and the like, or a mixture thereof may be exemplified, but are not limited thereto.

When a mixture of the cyclic carbonate ester and the chain carbonate ester is used, a volume ratio of the cyclic carbonate ester to the chain carbonate ester is preferably about 4:1 to about 1:4 from the viewpoint of optimizing the permittivity and viscosity.

Meanwhile, a shape of the non-aqueous electrolyte battery of the present disclosure may include a prism type or a cylindrical type, in which a steel can or an aluminum can is used as a casing (i.e., can casing). Further, it may be a package battery, in which a metal-deposited laminate film is used as a casing, but is not particularly limited thereto.

Advantageous Effects

A separator composition for a non-aqueous electrolyte battery of the present disclosure can strongly adhere an inorganic filler upon forming a heat-resistant porous layer of a separator, and can also further improve heat resistance of the separator by effectively dispersing the inorganic filler, and further can prevent a fire occurring under charge and discharge.

DETAILED DESCRIPTION OF THE EMBODIMENTS

Hereinafter, the actions and effects of the present invention will be described in more detail with reference to the specific exemplary embodiments of the present invention. However, these exemplary embodiments are for illustrative purposes only, and the scope of the present invention is not intended to be limited thereby.

EXAMPLE

Preparation of Polymer

Example 1

100 parts by weight of vinyl acetate and 20 parts by weight of vinyl 2-cyanoacetate were charged into a 2 L reactor containing 100 parts by weight of methanol, and 20 parts by weight of ethylene was added thereto, and it waited until there was no change in the internal pressure of the reactor.

After raising the temperature to 70° C., 0.3 parts by weight of AIBN as an initiator was dissolved in 5 parts by weight of methanol, charged into a reactor, stirred at 200 rpm for 6 hours, so that polymerization reaction proceeded. The reactor was cooled to room temperature to obtain a copolymer of the following Chemical Formula.

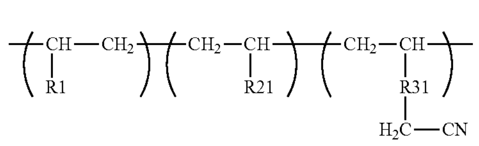

in Chemical Formula, R1 is hydrogen, R21 is acetate ($CH_3COO$—), and R31 is —C(=O)—O—.

(Addition Reaction)

As a base component, 5 parts by weight of potassium carbonate was dissolved in 5 parts by weight of methanol, and the mixture was charged into the cooled reactor, and stirred for 1 hour.

Hereto, 3 parts by weight of maleic acid was dissolved in 5 parts by weight of methanol, and the mixture was further charged into the reactor, and stirred again for 1 hour.

Then, 5 parts by weight of tetraethyl ethyne-1,2-diyldiphosphonate represented by the following Chemical Formula was charged into the reactor.

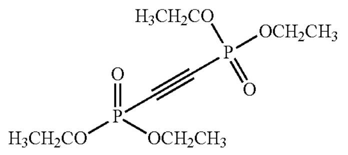

This was stirred for another 1 hour, and the remaining solvent was drained to obtain a copolymer of the following Chemical Formula.

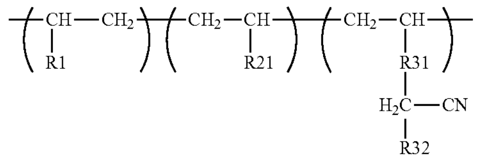

in Chemical Formula, R1 is hydrogen, R21 is acetate ($CH_3COO$—), R31 is —C(=O)—O—, and R32 is a flame retardant group represented by the following Chemical Formula, which is introduced from tetraethyl ethyne-1,2-diyldiphosphonate.

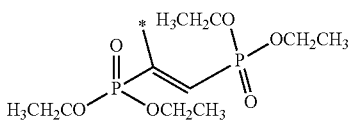

Example 2

A copolymer of the following Chemical Formula was obtained in the same manner as in Example 1, except that 20 parts by weight of ethenyl-3-oxobutanoate was used instead of 20 parts by weight of vinyl 2-cyanoacetate in the polymerization step.

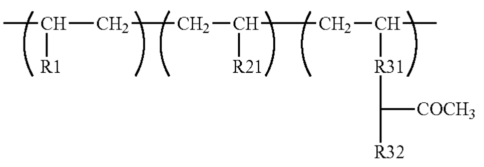

In Chemical Formula, R1 is hydrogen, R21 is acetate ($CH_3COO$—), R31 is —C(═O)—O—, and R32 is a flame retardant group represented by the following Chemical Formula which is introduced from tetraethyl ethyne-1,2-diyldiphosphonate.

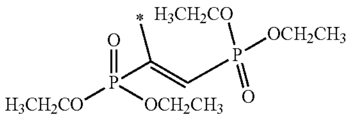

Example 3

A copolymer of the following Chemical Formula was obtained in the same manner as in Example 1, except that 150 parts by weight of vinyl acetate and 20 parts by weight of vinyl 2-cyanoacetate were charged into a 2 L reactor containing 100 parts by weight of methanol, and 15 parts by weight of ethylene and 0.3 parts by weight of AIBN as an initiator were used.

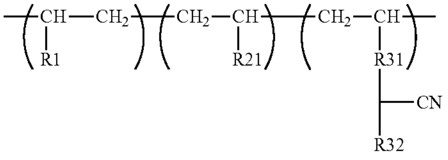

R32 is a flame retardant group represented by the following Chemical Formula which is introduced from tetraethyl ethyne-1,2-diyldiphosphonate.

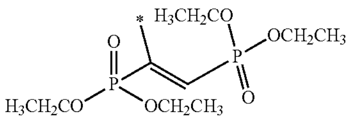

Example 4

A copolymer of the following Chemical Formula was obtained in the same manner as in Example 1, except that in the addition step, 10 parts by weight of potassium carbonate, 10 parts by weight of maleic acid, and 15 parts by weight of tetraethyl ethyne-1,2-diyldiphosphonate were used.

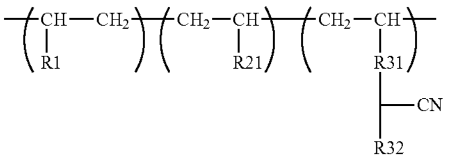

wherein, R1 is hydrogen, R21 is acetate ($CH_3COO$—), R31 is —C(═O)—O—, and R32 is a flame retardant group represented by the following Chemical Formula which is introduced from tetraethyl ethyne-1,2-diyldiphosphonate.

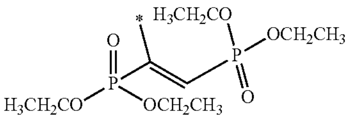

Example 5

A copolymer of the following Chemical Formula was obtained in the same manner as in Example 1, except that t-butanol was used instead of methanol.

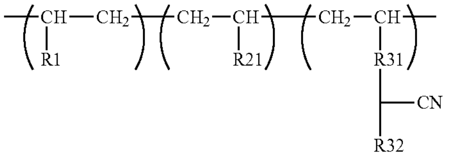

wherein, R1 is hydrogen, R21 is acetate ($CH_3COO$—), R31 is —C(═O)—O—, and R32 is a flame retardant group represented by the following Chemical Formula which is introduced from tetraethyl ethyne-1,2-diyldiphosphonate.

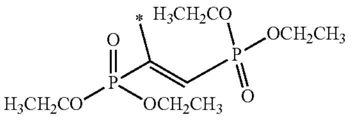

Example 6

A copolymer of the following Chemical Formula was obtained in the same manner as in Example 1, except that in the addition step, ethyne-1,2-diyldiphosphinic acid was used instead of (tetraethyl ethyne-1,2-diyldiphosphonate.

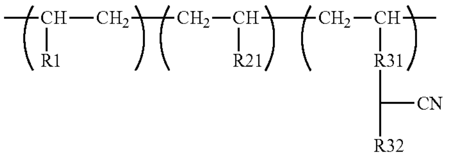

R32 is a flame retardant group represented by the following Chemical Formula, which is introduced from ethyne-1,2-diyldiphosphinic acid.

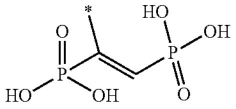 [SMILES: */C(=C\P(=O)(O)O)P(=O)(O)O]

Comparative Example 1

A copolymer was obtained in the same manner as in Example 1, except that in the polymerization step, vinyl propionate was used instead of vinyl-2-cyanoacetate.

Comparative Example 2

A copolymer was obtained in the same manner as in Example 1, except that in the addition step, diethyl ethyne-1,2-diyldicarboxylate was used instead of tetraethyl ethyne-1,2-diyldiphosphonate.

Measurement of Repeating Unit Ratio

Each repeating unit of the polymer processed using 1H-NMR.

The peak area was measured based on hydrogen of the ethylene group: about 1.0 to 1.2 ppm; hydrogen of the methyl group of vinyl acetate: about 2.0 ppm; hydrogen bonded to the double-bonded carbon in the flame retardant substituent group: about 6.1 to about 6.4 ppm, and each ratio was calculated.

Measurement of Weight Average Molecular Weight

A weight average molecular weight was analyzed by GPC with column PLgel Mixed B*2 and Detector waters RI equipment containing DMF (HPLC) and 0.05M LiBr (0.45 μm filtered) as solvents, and other measurement conditions are as follows.

Apparatus: Gel permeation chromatography GPC (apparatus name: Alliance e2695; manufacturer: WATERS)

Detector: Differential refractive index detector (apparatus name: W2414; manufacturer: WATERS)

Column: DMF column

Flow rate: 1 mL/min

Column temperature: 65° C.

Injection amount: 0.100 mL (2.0 mg/ml in DMSO)

Standard sample: Polymethyl methacrylate (third correction)

Preparation of Slurry

To 320 parts by weight of acetone, 1 part by weight of each polyvinyl alcohol-based polymer obtained in Examples and Comparative Example, and 7 parts by weight of polyvinylidene fluoride-hexafluoropropylene as a binder were added, and dissolved at 50° C. for 12 hr. 72 parts by weight of $Al_2O_3$ having a number average diameter of 500 nm as inorganic particles was added thereto, and each slurry was prepared using a ball mill method. Particle diameter characteristics and sedimentation rates of the slurries were measured.

Manufacture of Separator

The slurry of the flame-retardant group-containing polymer and inorganic particles prepared above was coated onto one surface of a polyethylene porous substrate using a doctor blade and dried to produce a separator on which a porous coating layer was formed.

Measurement of Sedimentation Rate

In order to confirm the dispersibility of the binder, the slurries prepared in Examples and Comparative Example were rotated at 300 rpm using a dispersion stability analyzer (LUMiSizer), and the sedimentation rate of alumina was measured at 25° C., and the results are shown in Table below. For reference, as the dispersibility of the flame retardant group-containing polymer is better, alumina is dispersed well and its sedimentation is slow.

Evaluation of Heat Shrinkage

The separators produced in Examples and Comparative Examples were placed in a heat-resistant oven at 150° C. and left for 2 hours.

Then, the separators were taken out, the lengths in the MD direction and the TD direction were measured, and the rate of decrease (%) was shown as compared with the size before heating.

Evaluation of Adhesion

Artificial graphite, carbon black, CMC, and a binder were mixed with water at a weight ratio of 96:1:1:2 to prepare a negative electrode slurry. The negative electrode slurry was coated onto a copper foil having a thickness of 50 μm, dried at 80° C. for 1 hour or longer, and then pressed to manufacture a negative electrode.

The negative electrode and the separator were put into lamination equipment and adhered. While this sample was peeled off at a rate of 100 mm/min using UTM equipment, the force required to peel the adhesive surface between the electrode and the separator was measured.

The measurement results are summarized in Table below.

| | Adhesion (gf/25 mm) | Sedimentation rate (μm/s) | Flame retardancy | Heat shrinkage (MD/TD, %) | Weight average molecular weight (100,000) | Repeating unit ratio (ethylene, vinyl acetate, flame retardancy, based on a total of 100) |
|---|---|---|---|---|---|---|
| Example 1 | 150 | 5 | V0 | 15, 18 | 2.5 | 25, 65, 10 |
| Example 2 | 130 | 7 | V0 | 18, 20 | 3.3 | 17, 73, 10 |
| Example 3 | 140 | 10 | V1 | 25, 25 | 1.8 | 32, 63, 5 |
| Example 4 | 145 | 15 | V1 | 20, 17 | 2.2 | 42, 48, 10 |
| Example 5 | 130 | 10 | V1 | 15, 18 | 3.5 | 35, 60, 5 |
| Example 6 | 130 | 8 | V1 | 16, 22 | 1.9 | 27, 53, 20 |
| Comparative Example 1 | 110 | 20 | HB | 30, 35 | 1.4 | — |
| Comparative Example 2 | 120 | 20 | HB | 30, 35 | 1.4 | — |

Referring to the above table, it can be confirmed that the slurries prepared by using the flame retardant group-containing polymer according to Examples of the present disclosure had similar or superior adhesion or dispersibility to the existing ones.

In addition, it was clearly confirmed that the separators manufactured using the flame retardant group-containing polymer showed very excellent flame retardancy and also was excellent in the stability against heat.

The invention claimed is:

1. A flame retardant group-containing polymer comprising:

a first repeating unit represented by Chemical Formula 1, a second repeating unit represented by Chemical Formula 2, and a third repeating unit represented by Chemical Formula

[Chemical Formula 1]

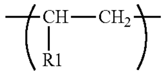

in Chemical Formula 1, R1 is hydrogen or an alkyl having 1 to 8 carbon atoms,

[Chemical Formula 2]

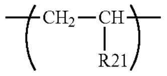

in Chemical Formula 2, R21 is an acetate ($CH_3COO$—) group,

[Chemical Formula 33]

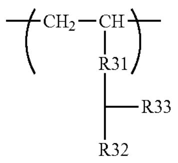

in Chemical Formula 3, R31 is —(C—O)O—, R32 is a phosphorus-containing flame retardant group, and R33 is a —CN, —$NO_2$, —CO—R34, —CON—R34, or —COO—R34, wherein R34 is hydrogen, or an alkyl having 1 to 5 carbon atoms.

2. The flame retardant group-containing polymer according to claim 1, wherein a ratio of a repeating number of the first repeating unit to a total repeating number of the first to third repeating units in the flame-retardant group-containing polymer is 0.1 to 0.5.

3. The flame retardant group-containing polymer according to claim 1, wherein a ratio of a repeating number of the second repeating unit to a total repeating number of the first to third repeating units in the flame-retardant group-containing polymer is 0.3 to 0.8.

4. The flame retardant group-containing polymer according to claim 1, wherein a ratio of a repeating number of the third repeating unit to a total repeating number of the first to third repeating units in the flame-retardant group-containing polymer is 0.01 to 0.3.

5. The flame retardant group-containing polymer according to claim 1, having a weight average molecular weight of 100,000 to 500,000.

6. The flame retardant group-containing polymer according to claim 1, wherein in Chemical Formula 3 R32 comprises at least one flame retardant group selected from the group consisting of:

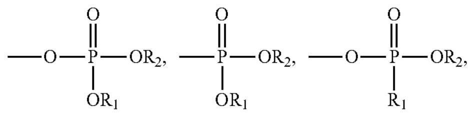

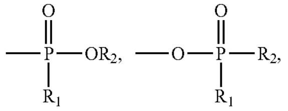

and

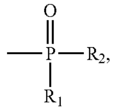

wherein, $R_1$ and $R_2$ in Chemical Formula 3 are each independently hydrogen, a monovalent metal cation, an ammonium ion, an alkyl group having 1 to 5 carbon atoms, a phenyl group, or an alkylaryl group having 7 to 10 carbon atoms.

7. The flame retardant group-containing polymer according to claim 6, wherein the $R_1$ and $R_2$ in Chemical Formula 3 are each independently hydrogen, an ammonium ion, an alkyl group having 1 to 5 carbon atoms, or a phenyl group.

8. A dispersant composition for a separator of a non-aqueous electrolyte battery, comprising the flame retardant group-containing polymer as set forth in claim 1.

9. The dispersant composition for the separator of the non-aqueous electrolyte battery according to claim 8, further comprising an inorganic filler.

10. The dispersant composition for the separator of the non-aqueous electrolyte battery according to claim 9, wherein the inorganic filler comprises one or more selected from the group consisting of inorganic oxides, inorganic nitrides, ionic crystal fine particles, covalently bonded crystals, clay, materials derived from mineral resources, and lithium titanium phosphate.

11. A separator of a non-aqueous electrolyte battery, the separator comprising: a porous substrate, and a heat resistant porous layer on one surface of the porous substrate, wherein the heat resistant porous layer comprises the dispersant composition for the separator of the non-aqueous electrolyte battery as set forth in claim 8.

12. The separator of the non-aqueous electrolyte battery according to claim 11, wherein the porous substrate comprises one or more resins selected from the group consisting of a polyolefin resin, a polyester resin, a polyacetal resin, a polyamide resin, a polycarbonate resin, a polyimide resin, a polyetheretherketone resin, and a polyethersulfone resin.

13. A non-aqueous electrolyte battery comprising: a positive electrode, a negative electrode, the separator of the non-aqueous electrolyte battery as set forth in claim 11, and an electrolyte solution.

* * * * *